May 17, 1949. R. B. BUCHANAN 2,470,468
GROUND TRAINER FOR AIRCRAFT
Filed Dec. 28, 1946 3 Sheets-Sheet 1
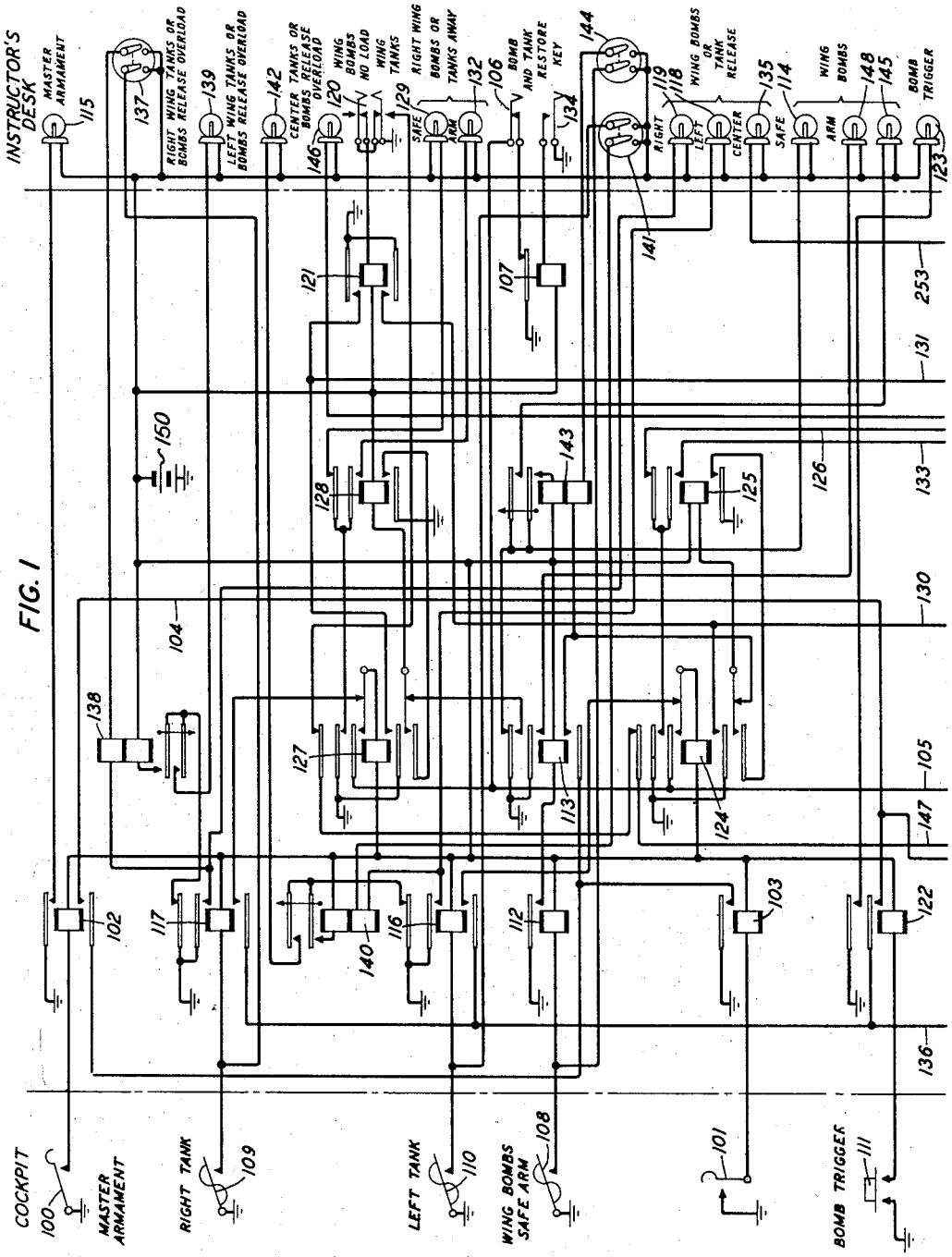
FIG. I
INVENTOR
R.B. BUCHANAN
BY
P. C. Smith
ATTORNEY May 17, 1949.   R. B. BUCHANAN   2,470,468
GROUND TRAINER FOR AIRCRAFT
Filed Dec. 28, 1946   3 Sheets-Sheet 2
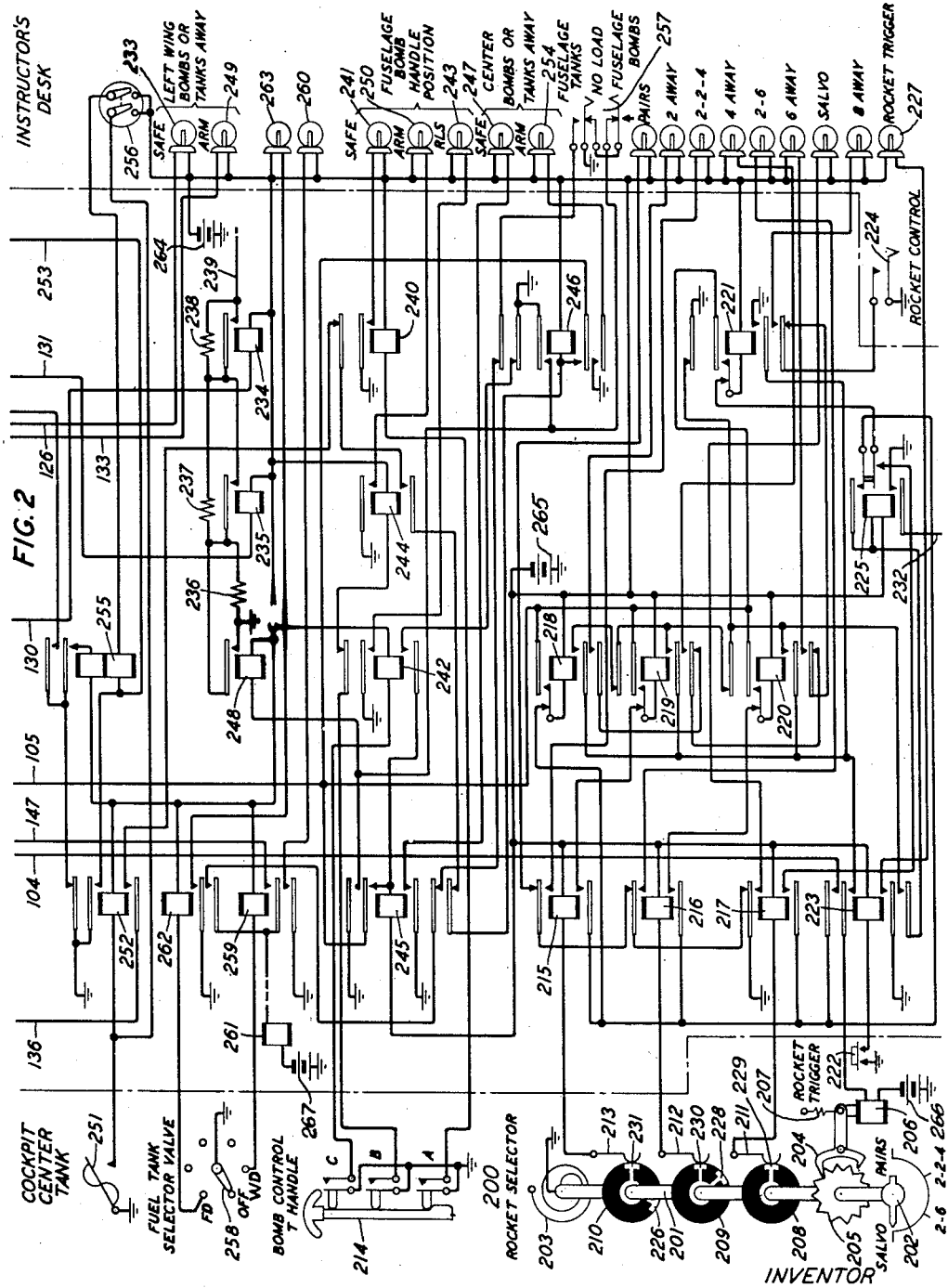

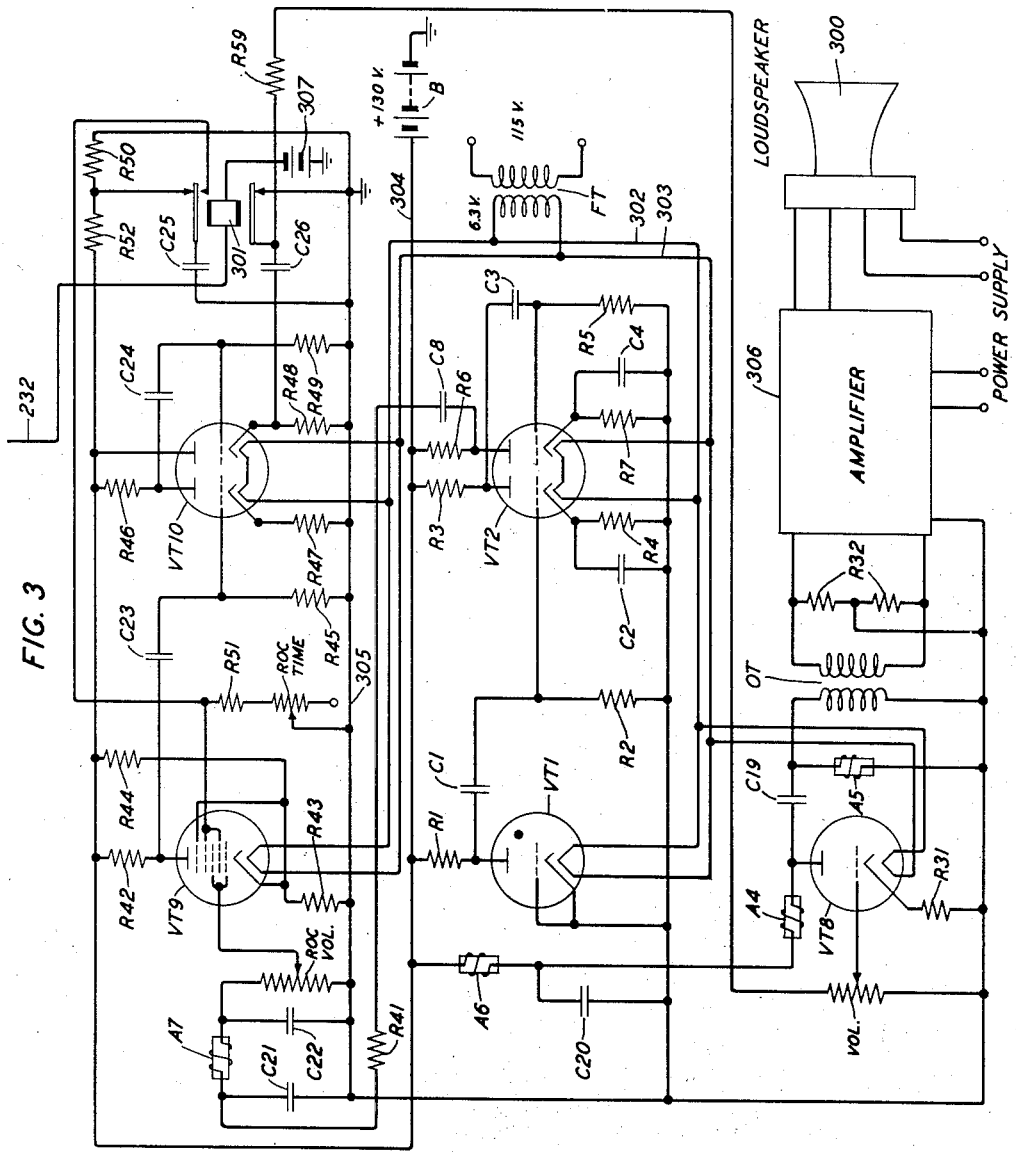

Patented May 17, 1949

2,470,468

UNITED STATES PATENT OFFICE 2,470,468

GROUND TRAINER FOR AIRCRAFT

Russell B. Buchanan, Lynbrook, N. Y., assignor to Bell Telephone Laboratories, Incorporated, New York, N. Y., a corporation of New York Application December 28, 1946, Serial No. 718,917

13 Claims. (Cl. 35—25)

This invention relates to an operational flight trainer and more particularly to circuits and apparatus for simulating the control of the armament of an airplane.

An airplane of the fighter type, which the trainer of this invention is designed to simulate, may be provided with a plurality of guns, with a plurality of rocket firing devices and with bomb releasing mechanism. For the sake of safety when the airplane is on the carrier deck, airfield or in formation flight but not in actual combat, the guns are not charged with shells and the bombs are not armed.

The charging mechanism of the guns of the airplane is hydraulically operated by pressure supplied from the hydraulic system of the airplane under the control of gun chargers located on the pilot's pedestal in the cockpit and operable by the pilot. A plurality of these gun chargers may be provided, each capable of controlling the charging of one or more guns. The operation of such chargers is simulated in the trainer under consideration in the manner fully disclosed in my Patent No. 2,459,867, granted January 25, 1949, on an application Serial No. 622,066, filed October 12, 1945.

In the airplane the rocket firing mechanism is arranged so that the eight rockets carried by the airplane may be released two rockets at a time; in two groups of two rockets each followed by a group of four rockets; in a single group of two rockets followed by the remaining six rockets or in a salvo of all eight rockets. To accomplish this a rocket selector is provided which may be set into the four selection positions above indicated and which may be released under spring power, step by step in response to the operation of the rocket trigger. When turned to the extreme right, one pair of rockets will be fired when the rocket trigger is depressed and the selector will be released to turn one step in a clockwise direction. Upon the next depression of the rocket trigger, a second pair of rockets will be fired and the selector will be released to turn a second step in a clockwise direction. Upon the next depression of the rocket trigger, a third pair of rockets will be fired and the selector will be released to turn a third step in a clockwise direction and upon the next depression of the rocket trigger, the final pair of rockets will be fired. It will be noted that if the selection is initially started from the second step position, two rockets may be fired in such position and the succeeding position and four rockets in the last position; that if the selector is initially set to the third step position, two rockets may be fired in such position and the remaining six rockets in the last position and that if the selector is initially set to its fourth step position, all of the rockets will be fired in salvo when the trigger is depressed.

The bombs on an actual airplane are arranged to be dropped either safe or armed as determined by the pilot. The two bombs carried on the wings and the fuselage or belly bomb may all be dropped simultaneously, singly, or in a two and one combination as determined by the pilot. A T handle is also provided by means of which the pilot may operate the releasing mechanism for the fuselage bomb. This handle is also used to safety the fuselage bomb. However, this bomb can be dropped safe only by the use of the T handle and when released by the electric control is always in an armed condition. The pilot may drop the wing bombs in a safe condition by operating a wing bomb key to a safe position, that is open, and will then close an RT or LT switch or both. He will next close the master armament switch and press the bomb trigger. If he desires to drop the bomb armed, he will follow the same procedure except that he will close the wing bombs switch.

Droppable gas tanks may be carried in place of the wing or fuselage bombs. These tanks are released in the same manner as the bombs which they replace.

It is the object of the present invention to simulate in a ground trainer, the selection and firing of rockets and the releasing of bombs or droppable tanks from an airplane.

To attain this object the trainer is provided with triggers, rocket selector, bomb or tank selector switches, master armament switch, T handle bomb release and wing bomb armament switches which are duplicates in appearance of the regular apparatus of the airplane which the trainer simulates and located in similar positions in the cockpit. This equipment is modified as required to control circuits whereby the functions simulated by the operations of such apparatus are electrically controlled. Provision is also made in the trainer for simulating the noise incident to the firing of rockets.

For a better understanding of the invention, reference may be had to the following detailed description when read in connection with the accompanying drawing in which:

Fig. 1 shows in the left portion thereof, certain of the armament controls in the cockpit of the trainer, in the right portion thereof, signaling equipment at an instructor's desk and in the central portion thereof, relay equipment responsive to the controls of Figs. 1 and 2;

Fig. 2 shows in the left portion thereof, additional controls in the cockpit of the trainer, in the right portion thereof additional signaling equipment at the instructor's desk and in the central portion thereof additional control relays; and, Fig. 3 shows circuits for simulating the noise incident to the firing of rockets.

For a complete disclosure of the invention, Fig. 2 should be placed beneath Fig. 1 and Fig. 3 should be placed beneath Fig. 2.

The rocket selector, designated by the numeral 200 of Fig. 2, comprises a shaft 201 which may be turned by the handle 202 against the restraint of the helical spring 203 from its normal position marked "Salvo" to the extreme position marked "Pairs." The shaft is held in its selected position by the engagement of the escapement dog 204 with the escapement wheel 205. The shaft is permitted to return from any set position to the "Salvo" position under the tension of the spring 203 through the operation of the dog 204 by the solenoid magnet 206. The plunger armature of the solenoid magnet is normally held in its unattracted position by the spring 207. The shaft 201 has secured thereto three commutators 208, 209, 210 with which the commutator brushes 211, 212 and 213 cooperate.

The bomb release T handle 214 has three positions into which it may be set, in successive ones of which positions the associated A, B and C switches are closed. In the lowermost position, in which the switch A is closed, the fuselage bomb is made safe. In the upper position in which the switch C is closed, the fuselage bomb is released. In the middle position in which the switch B is closed, the fuselage bomb is armed and if the handle is thereafter pulled to its upper position to close the switch C, the armed bomb is released.

The circuits disclosed in Fig. 3 for simulating the sounds incident to the release of rockets are similar to the sound effect circuits disclosed in the application Serial No. 622,065, of R. H. Gumley, filed October 12, 1945, but modified as required to produce the desired sound effects.

*Rocket selection*

It will be assumed that the pilot desires to simulate the firing of eight rockets in pairs and for this purpose operates the handle 202 of the rocket selector to the extreme right position marked "Pairs." In this position no circuits are established for the selector relays 215, 216 and 217 or the counting relays 218, 219, 220 and 221, and none of these relays is consequently operated. Under this condition a circuit is established from the battery 264 through the "Pairs" lamp at the instructor's desk, thence over the upper back contact of the relay 215, over the upper back contact of the relay 216 and the upper back contact of the relay 217 to ground and the lamp lights to inform the instructor that the pilot has moved the rocket selector handle 202 to its "Pairs" position. When thereafter the pilot depresses the rocket trigger 222, an obvious circuit is momentarily established for the relay 223 which over its inner lower contacts establishes an obvious circuit for the rocket trigger lamp 227 at the instructor's desk which lights to inform the instructor that the pilot has depressed the rocket firing trigger.

The operation of relay 223 establishes the circuit of the relay 218 if the pilot has operated the master armament switch 100 and the battery power switch 101 has previously been operated by the pilot. The operation of switch 101 simulates the application of battery power to the circuits of the airplane which require such power. The operation of these switches establishes obvious circuits for the relay 102 and the relay 103 from battery 150, relay 102 upon operating establishing an obvious circuit over its upper contact and to battery 150 for the master armament lamp at the instructor's desk which lights to inform the instructor of the fact that the master armament switch has been operated by the pilot. With the relays 102 and 103 both operated, the operation of the relay 223 as previously described is effective to establish a circuit from ground over the contacts of relay 103, over the lower contacts of relay 102, conductor 104, over the upper contacts of relay 223 and thence over the upper normal contacts and through the winding of the relay 218 to battery 265. Relay 218 thereupon operates and locks over its upper alternate contacts, over conductor 105, over the normal contacts of the bomb and tank restore key 106 at the instructor's desk, to ground over the upper normal contacts of the relay 107.

Relay 218, upon operating, establishes a circuit for the escape magnet 206 of the rocket selector 200 which may be traced from battery 266 through the winding of such magnet, over the inner upper contacts of the relay 223, over the inner lower contacts of relay 218, over the upper back contact of the relay 219, over the upper back contact of the relay 220 and to ground over the upper back contact of the relay 221. The magnet 206 thereupon operates and again releases when relay 223 releases following the release of the trigger 222 to advance the rocket selector to its first step position marker 2—2—4. Relay 218 also establishes a circuit which may be traced from battery 264 through the 2-away lamp at the instructor's desk, over the lower contacts of relay 218, over the lower back contact of the relay 219, over the lower back contact of the relay 220, over the lower back contact of the relay 221 and to ground over the contacts of the operated rocket control key 224 at the instructor's desk. The lamp then lights to inform the instructor that two of the rockets have been fired. Relay 223 upon operating also establishes a circuit for the relay 225 which circuit may be traced from ground over the upper back contact of relay 221, over the lower contacts of relay 223 and through the winding of relay 225 to battery 265, whereupon relay 225 operates and over its lower contacts closes an enabling circuit extending to the sound effects circuit of Fig. 3 for causing said sound effects circuit to produce sounds in the loud-speaker 300, representative of the sound of a rocket leaving the rocket launcher of the airplane. The manner in which the sound effects circuit functions will be hereinafter described.

As soon as the rocker trigger 222 is released the relay 223 releases followed by the release of the relay 225. The release of relay 223 extinguishes the rocket trigger lamp 227 and as previously described, releases magnet 206 of the rocket selector whereby the pawl 204 permits the advance of the ratchet wheel 205 under the tension of spring 203 so that such selector is released one half step toward its normal position. With the rocket selector in this position, a circuit is established from ground over segment 226 of commutator 210, over brush 213 and through the winding of the 4A relay 215 to battery 265. Relay 215, upon operating, opens the previously traced circuit for the lamp "Pairs" which becomes extinguished and establishes a circuit which may be traced from ground over the upper back contact of relay 217, over the upper back contact of relay 216, over the upper front contact of relay 215 and through the 2—2—4 lamp at the instructor's desk to battery 264, which lamp becomes lighted to indicate that the rocket selector has been advanced into its 2—2—4 position.

When thereafter the pilot depresses the rocket trigger 222 to fire an additional pair of rockets, the relay 223 and the relay 225 operate over the circuits previously traced. Relay 223, upon operating, again establishes the circuit of the lamp 227 which again lights and establishes a circuit for the relay 219 which may be traced from ground connected over contacts of relays 103 and 102 to conductor 104, over the uppermost contacts of relay 223, over the lower contacts of relay 215 and over the upper normal contacts and through the winding of relay 219 to battery 265. Relay 219 thereupon operates and locks over its upper alternate contacts to ground on conductor 105 and establishes the circuit of escape magnet 206 of the rocket selector which circuit may be traced from battery 266 through the winding of such magnet, over the inner upper contacts of relay 223, over the inner lower contacts of relay 219, over the upper back contact of relay 220 and to ground at the upper back contact of relay 221. Magnet 206 thereupon releases the rocket selector a half step towards its normal position. Relay 219 also opens at its lower back contact the previously traced circuit for the 2-away lamp at the instructor's desk and establishes a circuit for the 4-away lamp which may be traced from battery 264 through such lamp, over the lower front contact of relay 219, over the lower back contact of relay 220, over the lower back contact of relay 221 and to ground over the contacts of key 224.

When the rocket trigger 222 is again released, relays 223 and 225 release, the rocket trigger lamp 227 becomes extinguished, and escape magnet 206 releases so that the rocket selector is released a further half step toward its normal position or into the position designated 2—6. With the rocket selector in this position, the previously traced circuit for relay 215 is opened whereupon such relay releases to open the circuit of the 2—2—4 lamp at the instructor's desk and such lamp becomes extinguished. A circuit is now established from ground over segment 228 of commutator 209, brush 212 and through the winding of the relay 216 to battery. Relay 216 upon operating establishes a circuit for lighting the 2—6 lamp at the instructor's desk which circuit may be traced from ground over the upper back contact of relay 217, over the upper front contact of relay 216 and through the lamp 2—6 at the instructor's desk to battery 264 which lamp lights to inform the instructor that the rocket selector has been operated to the 2—6 position.

When thereafter, the pilot depresses the rocket trigger 222 to fire an additional pair of rockets the relay 223 and relay 225 operate over the circuits previously traced. Relay 223 upon operating again establishes a circuit for lamp 227 which again lights and establishes a circuit for the relay 220 which may be traced from ground on conductor 104, over the upper contacts of relay 223, over the lower contacts of relay 216 and over the upper normal contacts and through the winding of relay 220 to battery 265. Relay 220 thereupon operates and locks over its upper alternate contacts to ground on conductor 105 and establishes the circuit of escape magnet 206 of the rocket selector which may be traced from battery 266 through the winding of such magnet, over the inner upper contacts of relay 223, over the inner lower contacts of relay 220 and to ground over the upper back contact of relay 221. Magnet 206 thereupon operates and releases the rocket selector a half step towards its normal position. Relay 220 also opens at its lower back contact the previously traced circuit for the 4-away lamp at the instructor's desk and establishes a circuit for the 6-away lamp at the instructor's desk which may be traced from battery 264 through such lamp over the lower front contact of relay 220, the lower back contact of relay 221, and to ground over the contacts of key 224.

When the rocket trigger 222 is again released, relays 223 and 225 release, the rocket trigger lamp 227 becomes extinguished and escape magnet 206 releases so that the rocket selector is released a further half step to its normal position or into the position designated "Salvo."

With the rocket selector in this position, the previously traced circuit for relay 216 is opened, whereupon such relay releases to open the circuit of the 2—6 lamp at the instructor's desk and such lamp becomes extinguished. A circuit is now established from ground over segment 229 of commutator 208, brush 211 and through the winding of the relay 217 to battery 265 whereupon relay 217 operates. At the same time, the circuits of the relays 215 and 216 become established over the segments 231 and 230 of commutators 210 and 209 and such relays reoperate. The reoperation of relays 215 and 216 is without function at this time, but the operation of relay 217, establishes a circuit for lighting the "Salvo" lamp at the instructor's desk, the circuit of which may be traced from ground over the upper front contact of relay 217 and through the lamp to battery 264 whereupon the lamp lights to inform the instructor that the rocket selector has been advanced to the "Salvo" position.

When thereafter the pilot depresses the rocket trigger 222 to fire the additional or last pair of rockets, the relay 223 and the relay 225 operate over the circuits previously traced. Relay 225 upon operating locks over its upper contacts, and over the upper contacts of relay 223 to ground on conductor 104 so that such relay 225 will remain operated as long as relay 223 remains operated irrespective of the fact that the initial operating circuit of relay 225 is opened at the upper contacts of relay 221 upon the subsequent operation of the relay 221. Relay 223 upon operating again establishes the circuit of lamp 227 which again lights and establishes a circuit for the relay 221 which may be traced from ground on conductor 104, over the upper contacts of relay 223, over the lower contacts of relay 217, over the inner upper contacts of the relay 225 and over the inner upper normal contacts and through the winding of relay 221 to battery 264. Relay 221 thereupon operates and locks over its upper alternate contacts to ground on conductor 105 and establishes the circuit of escape magnet 206 of the rocket selector which may be traced from battery 266 through the winding of such magnet, through the inner upper contacts of relay 223 and to ground at the inner lower contacts of relay 221. Magnet 206 thereupon operates but the rocket selector being in its normal position does not advance. Relay 221 also opens at its lower back contact the previously traced circuit for the 6-away lamp at the instructor's desk and establishes a circuit for the 8-away lamp which may be traced from battery 264 through such lamp, over the lower front contact of relay 221 and over the contacts of key 224 to ground.

When the rocket trigger 222 is again released, relays 223 and 225 are released, the rocket trigger lamp 227 becomes extinguished and magnet 206 becomes deenergized but the rocket selector being at the time in its normal postiion, the release of magnet 206 is ineffective.

Should the rocket trigger be again operated, relay 223 will reoperate but with relay 221 still operated at that time, the relay 225 will not reoperate and therefore the sound effects circuit is not operated to simulate the sounds incident to the firing of further rockets.

If the initial setting of the rocket selector switch is other than in the "Pairs" position, the operation of the circuits is similar to that described above except that the starting point of relay operation will be with the relay 216 followed by the operation of the relay 219 if the selector is set into the 2—2—4 position; will be the relay 217 followed by the operation of the relay 220 if the selector is set into the 2—6 position or will be the operation of the relays 215, 216 and 217, followed by the operation of the relay 221 if the selector is set into the "Salvo" position. Also the "Pairs" and 2-away lamp will not light and the 2—2—4, 4-away, 2—6 and 6-away lamp may not light depending on whether the rocket selector switch is initially set in the 2—2—4, 2—6 or "Salvo" positions.

It will be recalled that when the relay 225 operates, it closes an enabling circuit for the rocket noise simulating circuits of Fig. 3. This circuit which is established each time that relay 225 operates in response to the depression of the rocket trigger 222, extends from ground over the lower contacts of relay 225, over conductor 232 and through the winding of relay 301 to battery 307 and relay 301 thus operates. The noise simulating circuits comprise the gas-filled or thyratron tube VT1 which functions as an oscillator, dual amplifier tubes VT2 and VT10 each having two units thereof connected in cascade, the preamplifier tube VT8 and the pentagrid amplifier tube VT9.

Filament heating current is supplied to the filaments of all the tubes over the supply conductors 302 and 303 which are connected to the secondary winding of the step-down filament supply transformer FT, the primary winding of which transformer is connected to a commercial supply source of 115 volts alternating current. Plate potential is supplied from the +130 volt battery B connected to the plate supply bus-bar 304, from which potential is supplied through resistors R1, R3, R6, R42 and R46 to the plates of tubes VT1, VT2, VT9 and VT10 and directly to the plate of the right unit of tube VT10 and through choke coils A6 and A4 in series to the plate of tube VT8. Potential from bus-bar 304 is also supplied through the potential divider resistors R43 and R44 to the ground bus-bar 305 from the junction point of which potential divider potential is supplied to the screen grid and cathode of tube VT9. Potential from bus-bar 304 is also applied through the resistors R52 and R50 in series to the ground bus-bar 305 and potential derived at the junction point between such resistors is applied over the upper back contact of relay 301, through condenser C25 to the ground bus-bar 305, whereby the condenser is normally charged. The potential at the plate of tube VT8 is applied over a circuit through condenser C19 and thence in parallel through choke coil A5 and the primary winding of output transformer OT to the ground bus-bar 305.

The ground bus-bar is connected directly to both the grid and cathode of oscillator tube VT1, through resistors R2 and R5 to the control grids of tubes VT2, through resistors R4 and R7 and condensers C2 and C4 to the cathodes of tube VT2, through resistor R31 to the cathode of tube VT8, through the resistor R43 to the cathode of tube VT9, through resistors R45 and R49 to the grids of tube VT10 and through resistors R47 and R48 to the cathodes of tube VT10.

The plate of the right unit of tube VT2 is connected through condenser C3, resistor R41 and through the filter comprising choke coil A7 and condensers C21 and C22, connected in parallel with the winding of the volume control rheostat ROC-VOL to ground, the slider of which rheostat is connected to the control grid of tube VT9. The suppressor grids of tube VT9 are connected through resistor R51 and the ROC-Time rheostat to the ground bus-bar.

Relay 301 when unoperated establishes the previously mentioned charging circuit for condenser C25 over its upper back contact and over its lower back contact connects direct ground through resistor R59 and through the VOL rheostat to the ground bus-bar 305 so that there shall be no input to amplifier tube VT8. When relay 301 is operated the charging circuit for condenser C25 is opened and a discharge circuit for such condenser is established over the upper front contact of relay 301 through resistor R51 and timing rheostat ROC-Time so that condenser C25 is permitted to discharge at the rate determined by the adjustment of such rheostat. Also with relay 301 operated, the ground connection to the upper terminal of rheostat VOL is opened and the cathode of the right unit of tube VT10 which unit functions as a cathode follower is connected through condenser C26, resistor R59 and rheostat VOL to the ground bus-bar 305 so that the output of the cathode follower tube is applied from the slider of rheostat VOL to the control grid of the preamplifier tube VT8.

It will be assumed that when the trainer is put into service, plate potential is applied from battery B to bus-bar 304, alternating current is supplied to the primary winding of filament transformer FT and that amplifier 306 and loudspeaker 300 are supplied with operating current. The filaments of all the tubes now become heated. With plate potential applied through plate resistor R1, with both its cathode and control grid connected to ground and its filament heated, tube VT1 now oscillates and generates random frequencies which are impressed upon the control grid of the left unit of amplifier tube VT2 through the condenser-resistance coupling comprising condenser C1 and resistor R2. The left unit of tube VT2 being supplied with plate potential connected to its plate through the plate resistor R3, having its grid biased with respect to its cathode by means of the cathode bias resistor R4 and modulated by the output of the oscillator VT1 applied to its grid through the coupling condenser C1, the left unit of tube VT2 responds to the output of tube VT1 and applies an amplified signal potential upon the grid of the right unit of tube VT2 over a path from such grid through coupling condenser C3, over the plate-cathode path through the left unit of tube VT2 and through resistor R4 in parallel with condenser C2 to ground. The right unit of tube VT2 having plate potential connected to its plate through plate resistor R6 and having its grid biased with respect to its cathode by means of the cathode biasing resistor R7 follows the amplified output signal from the left unit of tube VT2 and applies an amplified signal over a path from ground through the cathode biasing resistor R7 in parallel with condenser C4 over the cathode-plate path through the right unit of tube VT2, through coupling condenser C3, coupling resistor R41, through the filter network comprising choke coil A7 and condensers C21 and C22, connected in parallel with the winding of volume control rheostat ROC-VOL and to ground. Potential from this coupling circuit is now applied from the slider of the volume control rheostat to the control grid of the converter or gate tube VT9.

The grid of VT9 is biased with respect to its cathode through the cathode biasing resistor R43 at this time, plate potential is connected to its plate through plate resistor R42 and screen grid potential is connected to the screen grid of such tube through the resistor R44. The tube will not respond to the signal input potential applied to its control grid at this time, however, if relay 301 is not operated since the suppressor grids of tube VT9 will have ground potential applied thereto through resistor R51 and the timing rheostat ROC-Time.

It will now be assumed that as previously described the pilot has depressed the rocket trigger 222 to fire a pair of rockets and that in response to the operation of said key, the relay 225 has operated and in turn has caused the operation of relay 301. Relay 301, upon operating, connects the charged condenser C25 into a discharge path extending from ground through such condenser, over the upper front contact of relay 301, through resistor R51 and rheostat ROC-Time to ground. At the instant the discharge circuit is established, the full-charge potential of condenser C25 appears as a positive potential on the suppressor grid of tube VT9, whereupon tube VT9 becomes conducting and impresses its output upon the control grid of the left unit of tube VT10 through the condenser-resistor coupling comprising condenser C23 and resistor R45. The left unit of tube VT10 having plate potential applied to its plate through the plate resistor R46 and having its grid biased with respect to its cathode by the cathode bias resistor R47, now responds to the output signal from tube VT9 and applies an amplified signal potential upon the grid of the right unit of tube VT10 over a path from such grid through coupling condenser C24 over the plate-cathode path through the left unit of tube VT10 and through resistor R47 to ground. The right unit of tube VT10 having plate potential applied to its plate and its grid biased with respect to its cathode acts as a cathode follower and impresses its output through the coupling condenser C26 and resistor R59 upon the control grid of the preamplifier tube VT8. The gain of this tube may be regulated by the gain control rheostat VOL.

The tube VT8 serves to further amplify the signal and to impress it through the output transformer OT, upon the loudspeaker amplifier unit 306 which further amplifies the signal and applies the amplified signal upon the loudspeaker 300. The noise emitted by the loudspeaker will be a loud hiss.

As the charge on the condenser C25 becomes dissipated through the resistor R51 and the timing rheostat ROC-Time, the potential applied to the suppressor grid of tube VT9 will slowly decay. The time of decay is determined by the setting of the timing rheostat. As the potential applied to the suppressor grid of tube VT9 diminishes, the conductivity of the tube will diminish until it will cease when the condenser C25 becomes sufficiently discharged to reduce the potential on the suppressor grid of tube VT9 to a value such that the tube becomes blocked. Thus as the conductivity of tube VT9 decreases, the intensity of the "Whoosh" sound emitted by the loudspeaker 300 decreases simulating realistically the sound of a rocket as it is discharged and progresses away from an airplane.

When the relay 301 releases, following the release of the relay 225, the discharge path for condenser C25 is opened and the condenser again charges over its charging path. Also at its lower back contact relay 301 by connecting ground to the coupling circuit between the cathode follower unit of tube VT10 and the preamplifier tube VT8 prevents any input to the tube VT8 and thereby to the loudspeaker 300 as long as relay 301 remains unoperated or until the pilot again operates the rocket trigger 222 to simulate the firing of other rockets.

*Bomb releasing simulation*

It will now be assumed that the pilot desires to simulate the dropping of the wing bombs in a safe condition. He will first ascertain if the wing bomb key 108 is in the safe position, that is, open, and will then close the right tank switch 109 or the left tank switch 110 or both. He will next close the master armament switch 100 and press the bomb trigger 111. With switch 108 open the relay 112 and the relay 113 will both be unoperated and the wing bomb safe lamp 114 at the instructor's desk will be lighted over a circuit extending from battery 150 therethrough and to ground at the upper back contact of relay 113. The closing of the master armament switch 100 will cause the operation of the relay 102 and the lighting of lamp 115 at the instructor's desk as previously described.

If the left tank switch 110 has been closed, the relay 116 will be operated over a circuit extending from ground over the contacts of switch 110, through the winding of relay 116 and to battery 150, or if the right tank switch 109 has been closed, the relay 117 will be operated over a circuit extending from ground over the contacts of switch 109, through the winding of relay 117 and to battery 150, and if both switches have been operated, relays 116 and 117 will both operate. If relay 116 is operated, a circuit is established from ground over its upper front contact through the left wing bomb release lamp 118 at the instructor's desk and then to battery 150 and lamp 118 will light. If relay 117 is operated a circuit is established from ground over its upper front contact through the right wing bomb release lamp 119 at the instructor's desk to battery 150 which lamp will light. The lighting of either or both of these lamps informs the instructor that the pilot proposes to release such wing bombs. Under the assumption that there is a wing load of bombs, the key 120 at the instructor's desk will be operated to its upper position and the relay 121 will not be operated.

When the pilot depresses the bomb trigger 111, a circuit is closed for the relay 122 extending from ground over the contact of trigger 111 and through the winding of relay 122 to battery 150 which operates and establishes a circuit for the bomb trigger lamp 123 at the instructor's desk extending from ground over the upper outer contacts of relay 122, through the lamp 123 and to battery 150, which then lights to inform the instructor that the pilot has operated the bomb trigger. If the relay 116 has been previously operated, then when relay 122 operates, a circuit is established from ground on conductor 104, over the inner contacts of relay 122, over the lower contacts of relay 116, over the inner upper normal contacts and winding of the relay 124 to battery 150, whereupon relay 124 operates and locks over its inner upper alternate contacts to ground over conductor 105 the contacts of key 106 and the back contact of relay 107.

At its upper outer front contact, relay 124 establishes a circuit from ground, over the upper back contact of the relay 125, over conductor 126 and through lamp 233 at the instructor's desk to battery 264, which lamp lights to inform the instructor that the left wing bomb has been released in a safe condition. Had the relay 117 been operated, then upon the operation of the relay 122, a circuit would have been established from ground connected as previously described by the operation of relays 102 and 103 to conductor 104, over the inner contacts of relay 122, over the lower contacts of relay 117, over the inner upper normal contacts and through the winding of the relay 127 to battery and relay 127 would have operated and locked over its inner upper alternate contacts to ground over conductor 105, the contacts of key 106 and the back contact of relay 107 and would have established a circuit from ground over the outer upper front contact of relay 127, over the back contact of the relay 128 and through lamp 129 to battery 150. Lamp 129 would therefore have lighted to indicate to the instructor that the right wing bomb had been released in a safe condition.

If relay 124 is operated as above described, a circuit is established from ground over the inner lower contact of relay 124, over conductor 130 and through the winding of the relay 234 to battery 264, or if relay 127 is operated, a circuit is established from ground over the inner lower contacts of relay 127, over conductor 131 and through the winding of the relay 235 to battery 264. When relay 234 operates, it closes a short circuit around resistor 238 in a circuit which extends from ground through resistors 236, 237 and 238 in series and over conductor 239 to the circuits of the trainer which produce the indicated air speed and angle of climb effects of simulated flight. The short-circuiting of resistor 238 serves to produce the increase in the indicated air speed and angle of climb which would result in an airplane from the releasing of the left wing bomb. Similarly the operation of relay 235 short-circuits resistor 237 which produces a similar increase in indicated air speed and angle of climb which would result in an airplane from the releasing of the right wing bomb. If both wing bombs are released, then both relays 234 and 235 would be operated causing the short-circuiting of both resistances 237 and 238 and a resultant larger increase in the indicated air speed and angle of climb which would result from the release of both wing bombs.

The release of the bomb trigger 111 releases relay 122 and the opening of switches 109 and 110 releases relays 117 and 116 which in turn extinguish the lamps 129 and 233. Relays 124 and 127, however, remain locked operated until the relay 107 is operated in a circuit extending from battery 150 through the winding of relay 107 and over the contacts of key 134 to ground when key 134 is operated.

If tanks had been mounted in place of wing bombs, their release is the same as just described.

To simulate the safetying of the fuselage bomb, the pilot operates the T-handle 214 to a position in which the A switch is operated, thereby establishing an operating circuit for the relay 240 which extends from ground over the contacts of switch 214 closed in the A position, through the winding of relay 240 and to battery 264. This relay, upon operating, causes the lighting of the lamp 241 at the instructor's desk over a circuit extending from ground over the upper front contacts of relay 240, through lamp 241 to battery 264 to inform the instructor that the T-handle has been moved to the bomb safe position. To release the fuselage bomb in a safe condition, the T-handle is pulled up to a position in which the C switch is operated, thereby establishing a circuit for the relay 242 extending from ground over the contacts of switch 214 in its C position, and through the winding of relay 242 to battery 264 which upon operating causes the lighting of the release lamp 243 at the instructor's desk over a circuit from ground through the upper front contact of relay 242 and through lamp 243 to battery 264, as a signal that the T-handle has been moved to its release position. Relay 242, upon operating, prevents the operation of the relay 244 by opening the circuit thereof at its upper back contact and establishes a circuit for the relay 245 which may be traced from battery 265 through the winding of relay 245, over the lower contacts of relay 242 and to ground over the middle upper back contact of the relay 246. Relay 245, upon operating, locks over its inner upper contacts to ground over conductor 105, the contacts of key 106 and over the back contact of relay 117, establishes over its inner lower contacts a circuit for lighting the lamp 247 at the instructor's desk extending from ground over the inner lower front contact of relay 245 and through lamp 247 to battery 264, as a signal that the fuselage bomb has been released in a safe condition or if a gas tank has been mounted in the bomb rack that the tank has been dropped and over its upper outer contact establishes a circuit for the relay 248 which may be traced from ground over the contacts of relay 245 and through the winding of relay 248 to battery 264.

Relay 248, upon operating, shunts the resistor 236 in the circuit extending to conductor 239, thereby causing an increase in the indicated air speed and angle of climb which would result from dropping the fuselage bomb or tank.

Relay 245 at its outer lower back contact opens the circuit controlled by the bomb trigger 111 for operating the relay 246, which circuit may be traced from battery 264 through the winding of relay 246, over the outer lower back contact of relay 245, the lower contacts of relay 244, the upper back contact of relay 240, the lower contacts of relay 252, conductor 136, the inner upper contacts of relay 122, conductor 104, the lower contacts of relay 102 and to ground over the contacts of relay 103, so that such relay may not be operated by the operation of relay 122 in response to the operation of the trigger.

To drop the wing bombs in an armed condition, the pilot will operate the right tank switch 109 or the left tank switch 110 or both, will close the wing bomb arming switch 108 and the master armament switch 100 thereby closing the previously traced circuits for the relay 117, the relay 116 and the relay 102 and establishing a circuit for the relay 112 which may be traced from ground over the contacts of switch 108 and through the winding of relay 112 to battery 159. Relay 112 upon operating establishes a circuit for the relay 113 which may be traced from ground over the contacts of relay 112 and through the winding of relay 113 to battery 150. Relays 116, 117 and 102, upon operating, establish the circuits of the lamps 118, 119 and 115, respectively, as previously described and relay 113 establishes over its inner upper contacts a circuit for the wing tank arming lamp 148 at the instructor's desk extending from ground over the inner upper contacts of relay 113 and through lamp 148 to battery 150 to inform the instructor that one or both of the wing bombs is to be dropped in an armed condition. Relay 113 also establishes a circuit from ground over its upper outer front contact, over the lower normal contacts of the relay 127 and through the winding of the relay 128 to battery 150, thereby causing the operation of relay 128 and establishes a circuit from ground over the contacts of relay 103, over the lower contacts of relay 113, over the lower normal contacts of the relay 124 and through the winding of the relay 125 to battery 150 thereby causing the operation of relay 125.

If now the pilot depresses the bomb trigger 111, thereby operating the relay 122, the trigger lamp 123 at the instructor's desk is lighted and if the relay 117 has been operated in response to the operation of the right tank switch 109, a circuit is established from ground connected to conductor 104 over the upper contacts of relay 103 and the lower contacts of relay 102, over the inner contacts of relay 122, over the lower contacts of relay 117, through the upper normal contacts and winding of the relay 127 to battery 150 and relay 127 operates, locks over its inner upper alternate contacts to ground over conductor 105, the contacts of key 106 and the back contact of relay 107, completes the locking circuit of the relay 128 which extends over the lower alternate contacts of relay 127 to ground over the lower contacts of relay 128 and establishes a circuit from ground over its middle upper contacts, over the upper front contact of relay 128 and through lamp 132 to battery 150. Lamp 132 lights as a signal to the instructor that the right wing bomb has been released in an armed condition.

Similarly, if the relay 116 has been operated in response to the operation of the left tank switch 110, a circuit is established upon the operation of the bomb trigger 111, from ground connected to conductor 104 over the upper contacts of relay 103 and the lower contacts of relay 102, over the inner contacts of relay 122, over the lower contacts of relay 116, through the inner upper normal contacts and winding of the relay 124 to battery 150, and relay 124 operates, locks over its inner upper alternate contacts to ground over conductor 105, the contacts of key 106 and the back contact of relay 107, completes the locking circuit for the relay 125 which extends over the lower alternate contacts of relay 124 to ground over the lower contacts of relay 125, and establishes a circuit from ground over its middle upper contacts, over the upper front contact of relay 125, over conductor 133 and through the lamp 249 to battery 264. Lamp 249 lights as a signal to the instructor that the left wing bomb has been released in an armed condition. After the bomb trigger 111 has been pressed and released and the switches 109 and 110 have been opened, relays 116, 117 and 122 will release, but relays 124, 127, 125 and 128 will remain locked in their operated conditions until the instructor removes ground from conductor 105 by causing the operation of the relay 107 through the operation of key 134. With these relays locked operated, the lamps 132 and 249 remain lighted as signals to inform the instructor which bombs have been dropped in an armed condition.

To prepare the fuselage bomb for armed release, the pilot operates the T-handle 214 to its intermediate position in which the contacts of switch B are closed thereby establishing a circuit for the relay 244, which circuit extends from ground over the contacts of switch B, over the upper back contact of the relay 242 and through the winding of relay 244 to battery 264. Relay 244, upon operating, closes a circuit for lighting the lamp 250 at the instructor's desk extending from ground over the upper contacts of relay 244 and through lamp 250 to battery 264 to inform the instructor that the pilot has moved the T-handle to its arming position. Relay 244 also at its lower contacts prepares the circuit of the relay 246 to be later described. Also to prepare the fuselage bomb for armed release, the pilot closes the center tank switch 251 thereby establishing a circuit for the relay 252 extending from ground over the contacts of switch 251 and through the winding of relay 252 to battery 264 which, over its upper front contact and conductor 253 establishes the circuit of lamp 135 which lights to inform the instructor that the pilot intends to release the fuselage bomb. With the master armament switch 100, previously operated and relay 102 thus operated, when the pilot now depresses the bomb trigger 111 and relay 122 operates, a circuit is established from ground over the contacts of relay 103, over the lower contacts of relay 102, the inner contacts of relay 122, conductor 136, over the lower contacts of relay 252, the upper back contact of relay 240, the lower contacts of relay 244, the lower back contact of relay 245 and through the winding of the relay 246 to battery. Relay 246 thereupon operates and locks over its inner lower contacts to ground over conductor 105, the contacts of key 106 and the back contact of relay 107, closes a circuit over its lower contacts through lamp 254 to battery 264, which lights to inform the instructor that the fuselage bomb has been dropped and establishes a circuit from ground over its inner upper contacts through the winding of relay 248 to battery 264 which thereupon operates to shunt out resistor 236 whereby the indicated air speed and angle of climb circuits of the trainer are controlled to show the increase in air speed and angle of climb which would be incident to dropping the fuselage bomb.

If after the dropping of all the bombs has been simulated, it appears desirable to repeat the process of dropping the bombs, the instructor can replace the bomb load by operating the key 106 thereby releasing any of the armament relays 124, 125, 127, 128, 245 and 246 which may have been locked operated under the control of the relay 107. Also after the trainer flight has been completed and the trainer is again on the ground, the operation of the reload and recharge key 135 will release all of the operated armament relays that have been locked under the control of the relay 107.

Circuit breaker overload simulation

Switches 108, 109, 110 and 251 are of the circuit breaker type, that is, they will open automatically on a current overload condition. To simulate these overload conditions, keys are provided at the instructor's desk for connecting a battery directly to the switches.

It will be assumed that the switch 109 has been closed by the pilot resulting in the operation of the relay 117 and that to simulate the blowing of this circuit breaker switch, the instructor closes the overload switch 137. The closing of switch 137 applies battery directly over the left contacts thereof to a point between the circuit breaker switch 109 and the winding of relay 117. At the same time a circuit is established from battery 150 over the right contacts of the switch 137, through the upper winding of the relay 138 and to ground at the upper front contact of relay 117. Relay 138 will therefore operate before the connection of the direct battery to the circuit breaker switch 109 causes such switch to blow open and open the circuit relay 117. Relay 138, upon operating, partially closes a locking circuit from battery 150 through its lower winding and inner lower contacts which becomes completed to ground over the back contact of relay 117 as soon as relay 117 releases. Relay 138 being slow-to-release will not release during the interval between the opening of its initial energizing circuit at the upper front contact of relay 117 and the completion of its locking circuit at the back contact of relay 117. With relay 117 released and relay 138 operated, a circuit is established from ground over the back contact of relay 117 and over the lower contacts of relay 138 through the lamp 139 to battery 150. Lamp 139 will then light to inform the instructor that the circuit breaker switch 109 has been blown. At the same time the release of relay 117 extinguishes lamp 119 at the instructor's desk.

When the instructor opens the overload switch 137, relay 117 will remain released and relay 138 will remain operated. When the pilot again closes the circuit breaker switch 109, relay 117 will again operate opening the locking circuit of relay 138 whereupon relay 138 will release opening the circuit of lamp 139 which becomes extinguished and again causes the lighting of lamp 119.

The relay 140 functions with relay 116, circuit breaker switch 110 and overload switch 141 and lamp 142 at the instructor's desk; the relay 143 functions with relay 113, circuit breaker switch 110 and overload switch 144 and lamp 145 at the instructor's desk; and the relay 255, functions with relay 252, circuit breaker switch 251 and overload switch 256 and lamp 146 at the instructor's desk in a manner similar to the operation of the relay 138 just described.

The instructor is provided with two keys 129 and 257, each of which is a three position key. If the key 129 is in its center position, representative of the absence of either a bomb or fuel tank load on the wings, a circuit is established for the relay 121 extending from ground over the normal contacts of key 129 and through the winding of relay 121 to battery 150, which operates to close circuits over conductors 130 and 131 through the windings of relays 234 and 235 to battery 264 which operates to short-circuit resistors 237 and 238 from the circuit over conductor 239 so that the indicated air speed and angle of climb circuits of the trainer function in a manner representative of no wing load. If the switch 257 is in its center position, representative of the absence of either a bomb or fuel tank in the bomb rack of the fuselage, a circuit is established from ground over the contacts of such switch through the winding of relay 248 to battery 264 so that the indicated air speed and angle of climb circuits function in a manner representative of no fuselage load.

When the switch 129 is operated to open its upper contacts, a bomb load condition for the wings is set up and relay 121 is released to release relays 234 and 235 and when the switch 257 is operated to its lower position, a bomb load condition for the fuselage is set up and relay 248 is released. When the switch 129 is operated to close its lower contacts, relays 121, 234 and 235 are released and a condition is set up representative of a fuel tank load on the wings and when the switch 257 is operated to its upper position, relay 248 is released and a condition is set up representative of a fuel load on the fuselage.

The pilot is provided with a fuel selector valve by means of which fuel may be trunked from any of the fuel tanks of the airplane to either one or both of the engines. This valve is simulated in the trainer by the switch 258. In the WD position of the switch, the trunking of fuel from the wing tanks is simulated. In this position a circuit is established for the relay 259 extending from ground over the contacts of switch 258 and through the winding of relay 259 to battery 264 which closes a circuit for lamp 260 at the instructor's desk extending from ground over the outer lower contacts of relay 259 and through the lamp 260 to battery 264 to inform the instructor that fuel is being taken from the droppable wing tanks. With the switch 129 at the instructor's desk set into its lower position, a circuit is established from ground over the lower contacts of such switch, over the upper back contact of the relay 127, the upper back contact of the relay 124, conductor 147, over the contacts of relay 259 and through the winding of the fuel supply relay 261 of the trainer to battery 267 and relay 261 operates to indicate that fuel is being supplied to an engine or engines from the droppable wing tanks. Thereafter when the pilot causes the dropping of either of the wing tanks after the fuel is withdrawn therefrom and either the relay 127 or the relay 124 becomes operated, the circuit of the relay 261 will be opened and the engine being supplied from such tank will stop unless a switch over to another tank is made by a resetting of the fuel tank selector switch 258 prior to dropping the wing tanks. The trainee will know that the stopping of the engine is being simulated by the stopping of the simulated engine noise and the operation of the tachometer of the trainer.

In the FD position of the switch 258, the drawing of fuel from the droppable fuselage tank is simulated. In this position, a circuit is established for the relay 262 extending from ground over the contacts of switch 258 and through the winding of relay 262 to battery 264, which closes an obvious circuit for the lamp 263 at the instructor's desk to inform the instructor that fuel is being taken from the droppable fuselage tank. With the switch 257 at the instructor's desk set into its fuselage tank position, a circuit is established from ground over the upper contacts of such switch, over the upper back contact of the relay 246, over the middle lower back contact of the relay 245, over the lower contacts of relay 262 and through the winding of the relay 261 to battery. Relay 261 thereupon operates to indicate that fuel is being supplied to an engine or engines from the droppable fuselage tank. Thereafter, when the pilot causes the dropping of the fuselage tank, after the fuel has been taken from it and either relay 245 or 246 is operated, the circuit of the relay 261 will be opened and the engine being supplied from such tank will stop unless a switch over to another tank is made by a resetting of the fuel tank selector switch 258 prior to dropping the fuselage tank.

What is claimed is:

1. In an aircraft trainer wherein the operation of the armament of an airplane is simulated, a train of counting relays, an instructor's desk, lamps at said desk responsive to said relays to indicate the simulated release of successive rockets, a rocket selector switch, means for advancing said switch step-by-step in response to the operation of successive ones of said counting relays, a plurality of relays successively operable in successive positions of said switch, a trigger key, and means effective upon successive operations of said key and upon the successive operation of said latter relays to cause the successive operation of said counting relays.

2. In an aircraft trainer wherein the operation of the armament of an airplane is simulated, a train of counting relays, an instructor's desk, lamps at said desk responsive to said relays to indicate the simulated release of successive rockets, a rocket selector switch, means for advancing said switch step-by-step in response to the operation of successive ones of said counting relays, a plurality of relays successively operable in successive positions of said switch, other lamps at said instructor's desk responsive to said latter relay to indicate the position to which said switch has been moved, a trigger key, and means effective upon the successive operations of said means and upon the successive operation of said latter relays to cause the successive operation of said counting relays.

3. In an aircraft trainer, wherein the operation of the armament of an airplane is simulated, a train of counting relays, an instructor's desk, lamps at said desk responsive to said relays to indicate the simulated release of successive rockets, a rocket selector switch manually settable into a plurality of positions representative of the selected release of different groups of rockets, means for releasing said switch from its set position step-by-step in response to the operation of successive ones of said counting relays, a plurality of relays successively operable in successive positions of said switch, other lamps at said instructor's desk responsive to said latter relays to indicate the position to which said switch has been manually set, a trigger key, and means effective upon successive operations of said key and upon the successive operation of said latter relays to cause the successive operation of said counting relays.

4. In an aircraft trainer wherein the operation of the armament of an airplane is simulated, a train of counting relays, an instructor's desk, lamps at said desk responsive to said relays to indicate the simulated release of successive rockets, a rocket selector switch, means for advancing said switch step-by-step in response to the operation of successive ones of said counting relays, a plurality of relays successively operable in successive positions of said switch, a trigger key, means effective upon successive operations of said key and upon successive operations of said latter relays to cause the successive operation of said counting relays, and a lamp at said instructor's desk responsive to said trigger key for indicating to the instructor each operation of said key.

5. In an aircraft trainer wherein the operation of the armament of an airplane is simulated, a train of counting relays, an instructor's desk, lamps at said desk responsive to said relays to indicate the simulated release of successive rockets, a rocket selector switch, means for advancing said switch step-by-step in response to the operation of successive ones of said counting relays, a plurality of relays successively operable in successive positions of said switch, a trigger key, means effective upon successive operations of said key and upon successive operations of said latter relays to cause the successive operation of said counting relays, and means responsive to the operation of said trigger key to simulate the sounds incident to the discharge of each rocket.

6. In an aircraft trainer wherein the operation of the armament of an airplane is simulated, a master armament switch, a train of counting relays, an instructor's desk, lamps at said desk responsive to said relays to indicate the simulated release of successive pairs of rockets, a rocket selector switch manually settable into a plurality of positions representative of the selective release of different groups of rockets, means for releasing said switch from its set position step-by-step in response to the operation of successive ones of said counting relays, a plurality of relays successively operable in successive positions of said switch, other lamps at said instructor's desk responsive to said latter relays to indicate the position to which said switch has been manually set, a trigger key, means responsive to the operation of said master armament switch and effective upon the successive operation of said key and upon the successive operation of said latter relays to cause the successive operation of said counting relays, a lamp at said instructor's desk responsive to said trigger key for indicating to the instructor each operation of said key, and means responsive to the operation of said trigger key to simulate the sounds incident to the discharge of each rocket.

7. In an aircraft trainer wherein the operation of the armament of an airplane is simulated, a master armament switch, selecting switches for simulating the selection of wing supported bombs for release in either an armed or a safe condition, a further switch operable to determine if the selected bombs are to be released in a safe or armed condition, a trigger key, relays responsive to the conjoint control of said master armament switch, said selecting switches and said key, an instructor's desk and lamps at said desk responsive to the operation of said relays if said further switch has not been operated to indicate to the instructor that said bombs have been released in a safe condition.

8. In an aircraft trainer wherein the operation of the armament of an airplane is simulated, a master armament switch, selecting switches for simulating the selection of wing supported bombs for release in either an armed or a safe condition, an instructor's desk, lamps at said desk responsive to said switches to indicate which of said wing bombs is to be released, a further switch operable to determine if the selected bombs are to be released in a safe or armed condition, a trigger key, relays responsive to the conjoint control of said master armament switch, said selecting switches and said key, and lamps at said desk responsive to the operation of said relays if said further switch has not been closed to indicate to the instructor that the indicated bombs have been released in a safe condition.

9. In an aircraft trainer wherein the operation of the armament of an airplane is simulated, a master armament switch, selecting switches for simulating the selection of wing bombs for release in either an armed or a safe condition, a further switch operable to determine if the selected bombs are to be released in a safe or armed condition, a relay responsive to said latter switch if said bombs are to be released in an armed condition, a trigger key, relays responsive to the conjoint operation of said master armament switch, said selecting switches and said key, an instructor's desk and lamps at said desk responsive to the conjoint operation of said first and said latter relays if said further switch has been operated to indicate to the instructor that said bombs have been released in an armed condition.

10. In an aircraft trainer wherein the operation of the armament of an airplane is simulated, a master armament switch, selecting switches for simulating the selection of wing supported bombs or fuel tanks for release, an instructor's desk, a switch at said desk for determining whether bombs or fuel tanks are assumed to be carried in the wing racks, a fuel selector switch operable by the pilot to simulate the selection of fuel tanks for connection to the assumed engines of the trainer, means operable under the joint control of said fuel selector switch and said switch at the desk when said fuel selector switch is set into a position representative of the selection of droppable wing tanks and the instructor has operated said switch at the desk to represent the operation of an engine by fuel drawn from the wing tanks, a lamp at the instructor's desk responsive to the operation of said fuel tank selector switch to indicate the selection of the wing tanks for fuel supply, a trigger key, relays responsive to the conjoint control of said master armament switch, said first-mentioned selecting switches and said trigger key for releasing said engine operating simulation means representative of the stoppage of fuel supply to the engine incident to the dropping of the droppable wing tank, and lamps at said instructor's desk responsive to said relays to indicate to the instructor that the wing tanks have been dropped.

11. In an aircraft trainer wherein the operation of the armament of an airplane is simulated, a fuselage bomb control handle operable into a first position for simulating the safetying of the fuselage bomb, into a second position for simulating the arming of said bomb, and into a third position for simulating the releasing of said bomb, relays selectively operable in the several positions of said handle, an instructor's desk, lamps at said desk responsive to said relays to indicate the position into which said handle has been operated, a lamp at said instructor's desk, and a relay responsive to the operation of that one of said first relays which is operated when said handle is moved to its third or releasing position directly from its first or safetying position for lighting said latter lamp for indicating to the instructor that the release of the bomb in a safe condition has been simulated.

12. In an aircraft trainer wherein the operation of the armament of an airplane is simulated, a master armament switch, a fuselage bomb selector switch, a fuselage bomb control handle operable into a first position for simulating the safetying of the fuselage bomb, into a second position for simulating the arming of said bomb, and into a third position for simulating the releasing of said bomb, relays selectively operable in the several positions of said handle, an instructor's desk, lamps at said desk responsive to said relays to indicate the position into which said handle has been operated, a bomb trigger key, a relay responsive to the conjoint operation of said master armament switch, said selector switch and said trigger key and one of said first relays if said handle has been operated into its second or arming position, and a lamp responsive to the operation of said latter relay to indicate to the instructor when the release of the bomb in an armed condition is simulated.

13. In an aircraft trainer wherein the operation of the armament of an airplane is simulated, an instructor's desk, a switch at said desk for determining whether a bomb or a fuel tank is assumed to be carried beneath the fuselage, a fuel tank selector handle operable by the pilot to simulate the selection of fuel tanks for connection to the assumed engine of the trainer, a selector switch controlled by said handle means operable when the latter switch is set into a position representative of the selection of a droppable fuselage tank and the instructor has operated said switch at said desk to represent the operation of an engine by fuel drawn from the fuselage tank, a lamp at the instructor's desk responsive to the operation of said fuel tank selector switch to indicate the simulation of the selection of the fuselage tank for fuel supply, a fuselage bomb control handle operable into a position for indicating the simulation of releasing the droppable fuselage tank, a relay responsive to the operation of said handle, a lamp at said desk responsive to the operation of said relay to indicate to the instructor that said handle has been operated to its bomb release position, and a relay responsive to the operation of said first relay for releasing said engine operating simulation means representative of the stopping of fuel supply to the engine incident to the dropping of the droppable tank, and a lamp at said instructor's desk responsive to said latter relay to indicate to the instructor that the fuselage tank has been dropped.

RUSSELL B. BUCHANAN.

REFERENCES CITED

The following references are of record in the file of this patent:

UNITED STATES PATENTS

| Number | Name | Date |
|---|---|---|
| 2,218,546 | Muller | Oct. 22, 1940 |
| 2,341,678 | Wickes | Feb. 15, 1944 |
| 2,375,004 | Knowles | May 1, 1945 |